(12) United States Patent
Staffler et al.

(10) Patent No.: US 12,633,105 B2
(45) Date of Patent: May 19, 2026

(54) AUTOMATICALLY ASCERTAINING AN OPTIMAL ARCHITECTURE FOR A NEURAL NETWORK

(71) Applicant: Robert Bosch GmbH, Stuttgart (DE)

(72) Inventors: Benedikt Sebastian Staffler, Tuebingen (DE); David Stoeckel, Rutesheim (DE); Thomas Elsken, Vrees (DE)

(73) Assignee: ROBERT BOSCH GMBH, Stuttgart (DE)

( * ) Notice: Subject to any disclaimer, the term of this patent is extended or adjusted under 35 U.S.C. 154(b) by 334 days.

(21) Appl. No.: 18/473,136

(22) Filed: Sep. 22, 2023

(65) Prior Publication Data

US 2024/0177471 A1 May 30, 2024

(30) Foreign Application Priority Data

Nov. 30, 2022 (DE) ..................... 10 2022 212 901.6

(51) Int. Cl.
 *G06V 10/82* (2022.01)
 *G06V 10/70* (2022.01)
 (Continued)

(52) U.S. Cl.
 CPC ............ *G06V 10/82* (2022.01); *G06V 10/776* (2022.01); *G06V 10/84* (2022.01); *G06V 10/87* (2022.01)

(58) Field of Classification Search
 CPC ........ G06V 10/82; G06V 10/84; G06V 10/87; G06V 10/776
 See application file for complete search history.

(56) References Cited

U.S. PATENT DOCUMENTS 11,604,992 B2 * 3/2023 Fusi ........................ G06N 3/045
11,727,277 B2 * 8/2023 Hutter ..................... G06N 3/09
706/15

(Continued)

FOREIGN PATENT DOCUMENTS

CA 3005241 A1 * 11/2018 ............... G06N 5/01
WO WO-2018156942 A1 * 8/2018 ............. G06N 3/086

(Continued)

OTHER PUBLICATIONS

Karagiannakos, "Neural Architecture Search (NAS): basic principles and different approaches" (pp. 1-18) (Year: 2022).*

(Continued)

*Primary Examiner* — Manav Seth
(74) *Attorney, Agent, or Firm* — NORTON ROSE FULBRIGHT US LLP

(57) ABSTRACT

A computer-implemented method for ascertaining an optimal architecture for a neural network that solves a given task in accordance with given boundary conditions and/or optimization goals. The method includes: providing a graph of the possible architectures of nodes and edges, wherein nodes correspond to data, edges correspond to parameterized operations to be carried out on the data, and a path which traverses the entire graph corresponds to an architecture; in a search phase, generating candidate architectures based on already known architectures, wherein the candidate architectures are similar but not identical to the known architectures in accordance with a predetermined criterion; evaluating the candidate architectures using the given boundary conditions and/or optimization goals; ascertaining a candidate architecture having the best rating as the sought optimal architecture.

15 Claims, 3 Drawing Sheets

(51) Int. Cl.
     *G06V 10/776*          (2022.01)
     *G06V 10/84*           (2022.01)

(56)                  References Cited

U.S. PATENT DOCUMENTS

| | | | | |
|---|---|---|---|---|
| 11,836,595 | B1 * | 12/2023 | Yang | G06N 3/082 |
| 12,086,214 | B2 * | 9/2024 | Staffler | G06N 20/00 |
| 12,346,817 | B2 * | 7/2025 | Zoph | G06N 3/0442 |
| 12,393,840 | B2 * | 8/2025 | So | G06N 3/09 |
| 2018/0336453 | A1 * | 11/2018 | Merity | G06N 3/0442 |
| 2021/0201526 | A1 | 7/2021 | Moloney et al. | |
| 2022/0019890 | A1 * | 1/2022 | Staffler | G06N 3/0985 |
| 2022/0051079 | A1 * | 2/2022 | Laszlo | G06N 3/0455 |
| 2022/0114446 | A1 * | 4/2022 | Zela | G06N 3/0464 |
| 2022/0121906 | A1 * | 4/2022 | Kokiopoulou | G06N 3/0442 |
| 2023/0022777 | A1 * | 1/2023 | Staffler | G06V 10/82 |
| 2023/0306265 | A1 * | 9/2023 | Stoll | G06N 3/0985 |
| 2024/0013026 | A1 * | 1/2024 | Metzen | G06N 3/0985 |
| 2024/0296357 | A1 * | 9/2024 | Staffler | G06N 7/01 |
| 2024/0378458 | A1 * | 11/2024 | Metzen | G06N 3/0985 |

FOREIGN PATENT DOCUMENTS

| | | | | | |
|---|---|---|---|---|---|
| WO | WO-2019081705 | A1 * | 5/2019 | | G06F 16/9024 |
| WO | WO-2019084560 | A1 * | 5/2019 | | G06N 3/0445 |
| WO | WO-2020160252 | A1 * | 8/2020 | | G06N 3/045 |
| WO | WO-2020259502 | A1 * | 12/2020 | | G06N 7/01 |

OTHER PUBLICATIONS

Elsken et al., 2019, "Neural Architecture Search: a Survey" (pp. 1-21) (Year: 2019).*

Cai et al., "Once-For-All: Train One Network and Specialize It for Efficient Deployment," International Conference on Learning Representations, 2020, pp. 1-15. <https://openreview.net/pdf?id=HylxE1HKwS> Downloaded Sep. 20, 2023.

He et al., "AUTOML: a Survey of the State-Of-The-Art," Knowledge-Based Systems, vol. 212, 2021, pp. 1-37.

Stamoulis et al., "Hyperpower: Power- and Memory-Constrained Hyper-Parameter Optimization for Neural Networks," 2018 Design, Automation & Test in Europe Conference & Exhibition (Date), 2018, pp. 19-24.

* cited by examiner

AUTOMATICALLY ASCERTAINING AN OPTIMAL ARCHITECTURE FOR A NEURAL NETWORK

CROSS REFERENCE

The present application claims the benefit under 35 U.S.C. § 119 of German Patent Application No. DE 10 2022 212 901.6 filed on Nov. 30, 2022, which is expressly incorporated herein by reference in its entirety.

FIELD

The present invention relates to ascertaining an optimal architecture for a neural network that solves a given task in accordance with given boundary conditions and/or optimization goals. This problem is known as a Neural Architecture Search (NAS).

BACKGROUND INFORMATION

When a given problem, such as detection and/or classification of objects visible in images, is to be solved with neural networks, the first step is a search for a suitable network architecture. Until now, the network architecture has typically been selected by a human expert and is not always easy to set in motion. In many applications, such as in vehicle control units, the sought architecture is also subject to specific boundary conditions, for example with respect to memory requirements or energy consumption.

To automate the search for the appropriate architecture, Cai et al., "Once-for-all: Train one network and specialize it for efficient deployment", arXiv: 1908.0979 describes creating a graph of the possible architectures. This graph can be used for the search for the appropriate architecture and also for training said architecture.

SUMMARY

The present invention provides a computer-implemented method for ascertaining an optimal architecture for a neural network. The neural network is designed to solve a given task in accordance with given boundary conditions and/or optimization goals.

According to an example embodiment of the present invention, the method begins by providing a graph of the possible architectures of nodes and edges. In this graph, nodes correspond without loss of generality to data. The nodes at the beginning of the graph correspond to the input received by the neural network. The nodes at the end of the graph correspond to the output provided by the neural network. Nodes inside the graph correspond to intermediate products being processed in the neural network. The edges of the graph accordingly correspond to operations that receive the data of one or more nodes as inputs and contribute to the data of one or more other nodes. A path that passes through the entire graph from input to output corresponds to an architecture of the neural network that provides an output sought in the context of the given task and can thus solve said given task. A reverse allocation is possible as well, in which edges correspond to data and nodes correspond to operations. For the sake of clarity, only an allocation of nodes to data and edges to operations will be discussed in the following.

The term "path" in this context is not intended to be limiting in the sense that a path includes only one unique path from the input to the output. It is rather also quite possible that there are branches along the path and that it is a subgraph that connects the input to the output. For ease of reading, and to emphasize the traversal of the entire graph, the term "path" is used in place of "subgraph" in the following.

According to an example embodiment of the present invention, in a search phase of the method, candidate architectures are generated on the basis of already known architectures that correspond to paths which traverse the entire graph. These candidate architectures are similar but not identical to the known architectures in accordance with a predetermined criterion. The already known architectures can have been sampled from the graph in any desired manner, for instance. However, previously obtained candidate architectures, for instance, can also be used as a starting point for the generation of further candidate architectures.

The candidate architectures are evaluated using the given boundary conditions and/or optimization goals. A candidate architecture having the best rating is ascertained as the sought optimal architecture.

According to an example embodiment of the present invention, the candidate architectures can in particular be generated from one or more known architectures as part of an evolutionary algorithm, for example. The evolutionary algorithm can in particular comprise the fusion of multiple known architectures by crossing and/or (random) mutation of the architecture, for example, and also the subsequent evaluation of the thus generated candidate architecture. The evolutionary algorithm can in particular iteratively generate populations of candidate architectures and further refine the respective best candidate architectures. Evolutionary algorithms are particularly strong when optimizing for multiple optimization goals and/or boundary conditions. Most optimization methods are designed to pursue only a single optimization goal. Evaluating the generated candidate architectures using the given boundary conditions and/or optimization goals provides feedback for the (evolutionary) algorithm. New candidate architectures expected to provide further improvement in terms of the optimization goals and/or boundary conditions can thus be generated iteratively. A significant innovation of the here-proposed method is the special mutation of the candidate architecture on the basis of known architectures.

The targeted search specifically for candidate architectures that are similar to the already known architectures has the advantage that they do not necessarily require a vectorial representation of graphs in a vector space. Rather, there are search methods for candidate architectures similar to already known architectures that do not require a vectorial representation, but instead modify the graph directly. Vectorial representations serve to make the search for graphs amenable to numerical optimization: i.e. an optimization of the components of the vector. When the graphs are "embedded" in the vector space in this way, it is difficult to set in motion which quantities the vector components should represent. These are typically not physically tangible quantities; these quantities are rather to some extent comparable to latent variables produced in an auto encoder. Vectorial representations also usually do not completely fill the vector space. In other words, not every vector from the vector space corresponds to a valid graph. The vectorial representations instead form a difficult to delineate subspace of the vector space. Conversely, setting up a vectorial representation can require simplifications that result in not all of the candidate architectures that are possible in principle also having a vectorial representation. There can therefore be candidate architectures that are inaccessible when searching in the vector space.

Moreover, when creating arbitrary new paths that are supposed to correspond to new candidate architectures from a vectorial representation, there is generally no guarantee that this path will pass completely through the graph. If data are generated along a path, but these data are then not processed to the end for output relating to the given task, the candidate architecture is not suitable for solving this task. However, if the newly generated path is specifically sought in the vicinity of a path that is known to pass completely through the graph, then there is a high probability that the new path will also pass completely through the graph. This is somewhat comparable to the fact that enlarging a hole already drilled through a wall is more likely to be successful than drilling a new hole at a different location that may encounter new obstacles. Directly modifying an already known architecture as a graph structure, i.e. by specifying alternatives for existing edges and nodes, without using a vectorial representation, can be constrained from the outset in such a way that the new path also passes completely through the graph.

An optimal candidate architecture is consequently obtained more quickly, and this optimum will also be better in terms of the given task.

According to an example embodiment of the present invention, the method can, for example, in particular proceed from the situation in which the parameters of the parameterized operations that correspond to the edges have already been optimized by training with respect to the given task. In a particularly advantageous embodiment, however, learning steps regarding the given task can be carried out in a training phase for architectures sampled from the graph before the search phase. These learning steps can in particular be monitored. In other words, training examples are fed to the respective architecture, and the output provided by the architecture is compared to a target output with which the training example is labeled. The deviation of the output from the target output is evaluated with a cost function (loss function), and gradients of this cost function according to the parameters are used to ascertain the direction in which it would be meaningful to change the parameters. Such a modification is a learning step. A learning step can, for instance, in particular be carried out on a small subset ("mini-batch") with a few of the overall available training examples.

According to an example embodiment of the present invention, to be able to provide training examples to the candidate architecture, this candidate architecture is executed on a hardware platform. For this purpose, a program can be created with machine-readable instructions, for example, that, when executed on one or more processors, cause said processor or processors to process the training examples (or other inputs) to outputs relating to the given task in accordance with the candidate architecture. This program can then be executed on one or more processors, such as CPUs or GPUs. However, the candidate architecture can also be converted to a program for a programmable logical array (PLA) or a field-programmable gate array (FPGA), for example, and said program can then be loaded onto the PLA or FPGA. When training examples (or other inputs) are then provided to the PLA or FPGA, they are processed to outputs relating to the given task. The ultimately found optimal architecture can be implemented in the same way on a hardware platform and thus made available for processing any inputs to outputs relating to the given task.

According to an example embodiment of the present invention, the boundary conditions and/or optimization goals can, for instance, in particular include how quickly and/or with what accuracy, the candidate architecture solves the given task. This makes it possible to measure a computational effort in time or in CPU or GPU cycles, for example. The accuracy can, for instance, in particular be measured using test or validation data labeled with target outputs relating to the given task. It can also be provided as a boundary condition and/or optimization goal that specifically specified types of errors are avoided when solving the given task, for example. In a classification system that classifies objects visible in images of traffic situations for control of an at least partially self-driving vehicle, for example, it is a particularly serious error if a stop sign, a yield sign or a weaker traffic participant (pedestrian or two-wheeled driver), for instance, is not identified or is identified incorrectly. On the other hand, it is significantly less consequential if the specific number on a speed limit sign, for instance, is identified incorrectly.

As part of the evaluation relating to the boundary conditions and/or optimization goals, the candidate architecture can generally be provided with unseen test data and/or validation data in the training phase. If these test data and/or validation data are labeled with target outputs relating to the given task, the comparison of the output of the candidate architecture with the target output can be used as feedback for the assessment of the extent to which the boundary conditions or the optimization goals are fulfilled. However, even if the test data and/or validation data are not labeled, at least a plausibility of the output provided by the candidate architecture can be used as feedback.

Alternatively or also in combination, the boundary conditions and/or optimization goals can, for instance, in particular include how much working memory, how many processors and/or how many GPUs are needed to execute the candidate architecture. In particular on control units for vehicles for example, these resources are regularly in short supply. In this context, is in particular possible to pit multiple resources against one another. Ascertaining the sought architecture can therefore be steered in the direction of conserving resources that are particularly scarce in the respective application, for instance, at the cost of consuming more of the resources that are available in greater quantities.

According to an example embodiment of the present invention, the optimization can in particular be directed to achieving the best possible result with respect to the given task under the hard boundary condition of limited resources of a dedicated hardware (e.g. in a control unit), for example. It is quite possible that the best possible result cannot be achieved with these resources at all, but would require more resources. However, the best possible result under the hard boundary condition is achieved. This is analogous to completing challenging exams, where even the greatest and best possible structured learning effort does not automatically guarantee every examinee a very good grade. If the combination of quantity and difficulty of the tasks exceeds the cognitive abilities of the examinee, the best grade is unattainable. However, the examinee can optimize his preparation to obtain the best grade he can achieve or, if the specific grade is unimportant, to pass at all with the greatest probability.

The optimization can, for instance, also be focused on generating an architecture that provides a specific minimum performance and can at the same time be implemented with the smallest possible construction volume, energy consumption or financial commitment. Such demands are often imposed on neural networks used in control units for vehicles or other products sold on the mass market.

In a further advantageous embodiment of the present invention, the fulfilment of multiple boundary conditions and/or optimization goals is aggregated to a rating number. The number of boundary conditions and/or optimization goals to be taken into account can thus be compressed. Multiple optimization goals can form a rating number alongside an independent hard boundary condition, for instance, the non-fulfilment of which cannot be offset no matter how good the performance with respect to the optimization goals.

In a particularly advantageous embodiment of the present invention, generating candidate architectures includes selecting a subset of nodes of the path that corresponds to the known architecture and generating a modification of this path that still passes through all of the selected nodes. This makes it possible to enforce in a programmatically particularly easy to implement manner that the path which corresponds to the candidate architecture does not move too far away from the path that corresponds to the known architecture.

However, this goal can also be formulated explicitly. In a further particularly advantageous embodiment, generating candidate architectures includes generating a modification of the path that corresponds to the known architecture. which, in accordance with a predetermined metric, extends at no more than a predetermined distance from said path. The cost of the explicit formulation is the need for a metric.

In a further particularly advantageous embodiment of the present invention, generating candidate architectures includes sampling paths through the graph from a probability distribution that favors proximity to and/or intersections with the path that corresponds to the known architecture. The strict requirement for proximity can thus be relaxed.

The candidate architecture can also be composed of multiple architectures that correspond to multiple paths that pass through the entire graph, for example. A modification can be generated for a plurality of sampled paths, for example, and the candidate architecture can be composed of the respective architectures that correspond to these modifications.

The given task can in particular include evaluating measurement data, for instance. This measurement data can in particular be in the form of image data and/or point clouds, for example. Image data can include camera images, video images, thermal images, ultrasound images, radar images, and LiDAR images, etc. However, radar scans and LiDAR scans can in particular also be available as point clouds, for example, that assign values of one or more measured variables to only specific points in the space. The measurement data can also contain time series of one or more measured variables, for example.

In a particularly advantageous embodiment of the present invention, the given task includes mapping the input of the neural network to classification scores relating to one or more classes of a predetermined classification and/or to a regression value relating to at least one quantity of interest. Neural networks for these tasks are particularly complex, so that the search space of the possible architectures is accordingly large. These networks can include a feature extractor comprising multiple convolutional layers, for example, which can be configured with a plurality of filter kernels. In particular when optimizing for multiple optimization goals in combination with boundary conditions, manual compilation of the architecture is hindered by the fact that it is hard to predict which modification will lead toward the optimum. With the automated search according to the here-proposed method, the probability of finding the global optimum is significantly higher.

In a further particularly advantageous embodiment of the present invention, the ascertained optimal architecture, which can be implemented for this purpose as described above on any hardware platform, is provided with measurement data. These measurement data have been recorded with at least one sensor. A control signal is ascertained from the output obtained from the architecture. This control signal is used to control a vehicle, a robot, a driving assistance system, a system for quality control, a system for monitoring areas and/or a system for medical imaging. Since the neural network architecture being used is optimized in terms of optimization goals and/or boundary conditions, the probability that the response executed by the respective actuated technical system is appropriate to the situation embodied in the measurement data is advantageously increased. This is true in particular when the optimization was focused on achieving the best result with the given limited resources of a dedicated hardware, for instance.

In a further particularly advantageous embodiment of the present invention, the ascertained optimal architecture is trained or further trained with training examples respectively labeled with target outputs relating to the given task. This in particular makes it possible to supplement a training previously completed in a training phase of the entire graph. The training phase of the entire graph, in which learning steps for architectures that correspond to sampled paths are carried out, is comparable to brainstorming in a workshop in which each participant pins ideas onto a common pinboard. The dedicated training of the subsequently found optimal architecture then corresponds to the concentrated and focused pursuit of the idea that all of the participants have agreed upon.

According to an example embodiment of the present invention, the method is computer-implemented and can thus be embodied in software. The present invention therefore also relates to one or more computer program comprising machine-readable instructions which, when executed on one or more computers and/or compute instances, cause said computer (s) and/or compute instance (s) to carry out the described method. In this sense, control units for vehicles and embedded systems for technical devices that are likewise capable of executing machine-readable instructions are also considered to be computers. Compute instances can be virtual machines, containers or serverless execution environments, for example, that can be in particular be made available in a cloud.

The present invention further also relates to a machine-readable data carrier and/or to a download product comprising the one or more computer programs. A download product is a digital product that can be transmitted via a data network, i.e. can be downloaded by a user of the data network, and can, for example, be offered for sale in an online shop for immediate download.

One or more computers and/or compute instances can furthermore be equipped with the one or more computer programs, with the machine-readable data carrier or with the download product.

Further measures improving the present invention are shown in more detail below, together with the description of the preferred embodiment examples of the present invention, with reference to the figures.

DETAILED DESCRIPTION OF EXAMPLE EMBODIMENTS

Figure 1:
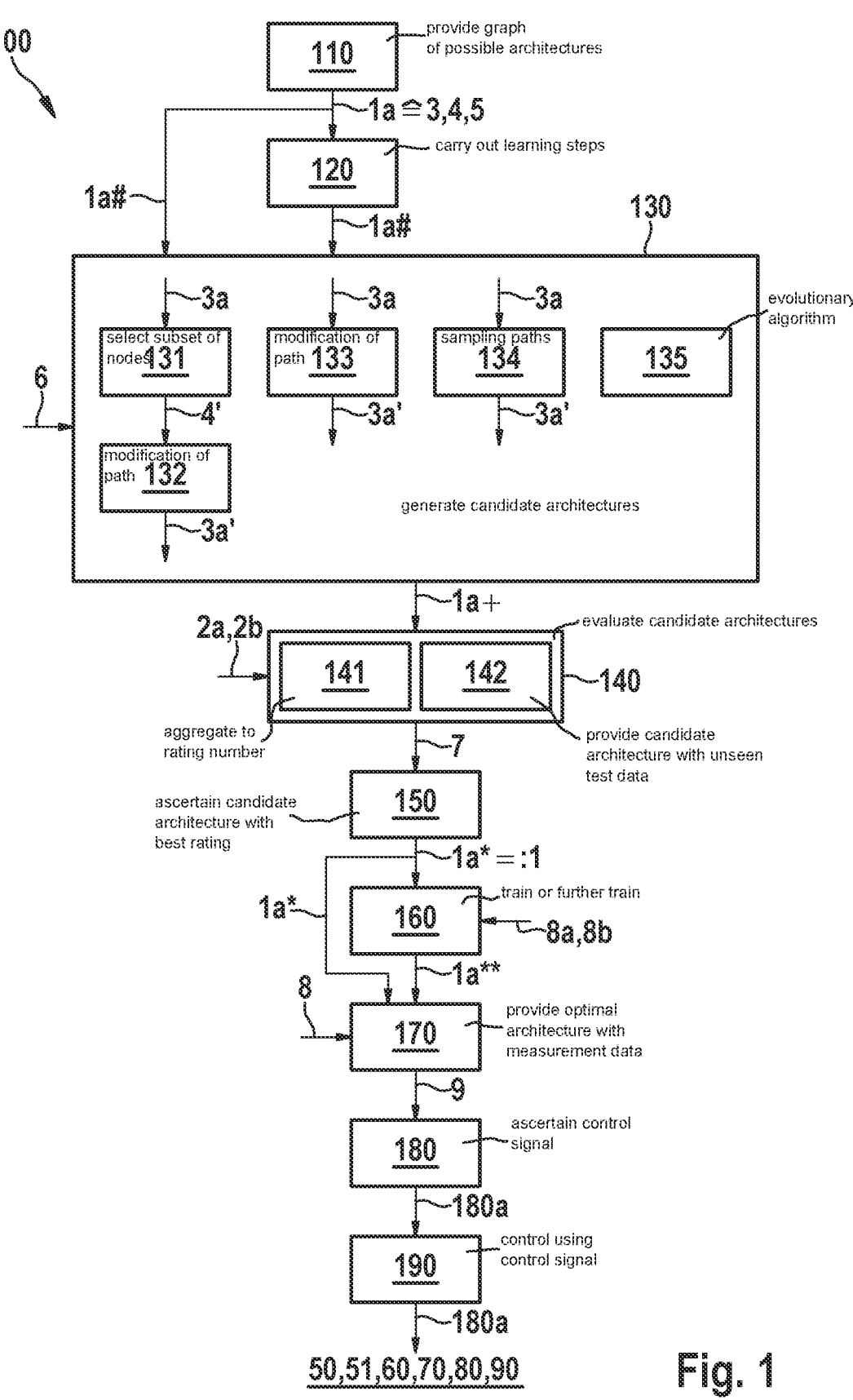
FIG. 1 shows an embodiment example of the method 100 for ascertaining an optimal architecture for a neural network, according to the present invention.

FIG. 1 is a schematic flowchart of an embodiment example of the method 100 for ascertaining an optimal architecture architectures 1*a for a neural network 1 that solves a given task in accordance with given boundary conditions 2***a* and/or optimization goals 2*b*.

In Step 110, a graph 3 of the possible architectures architectures 1*a* is provided. The graph 3 comprises nodes 4 and edges 5. The nodes 4 of the graph 3 correspond to data being processed in the neural network 1. The edges 5 of the graph 3 correspond to operations to be carried out on said data. These operations are parameterized, i.e. their behavior is characterized by parameters. A path 3*a* that traverses the entire graph 3 corresponds to a possible architecture 1*a* of the neural network 1. The space of the possible paths 3*a* that traverse the graph 3 thus defines the space of the possible architectures architectures 1*a* that solve the given task. As discussed above, the paths 3*a* can also include branches and can therefore be subgraphs.

In Step 120, learning steps regarding the given task are carried out in a training phase for architectures architectures 1*a* sampled from the graph 3. The parameters of the parameterized operations that correspond to the edges 5 of the graph 3 are thus adjusted.

In Step 130, candidate architectures architectures 1*a*+ are generated on the basis of already known, possibly sampled, architectures architectures 1*a*#. These candidate architectures architectures 1*a*+ are similar but not identical to the known architectures architectures 1*a*# in accordance with a predetermined criterion 6.

According to Block 131, generating candidate architectures architectures 1*a*+ can include selecting a subset 4' of nodes 4 of the path 3*a* that corresponds to the known architecture 1*a*#. According to Block 132, a modification 3*a'* of this path 3*a* can then be generated that still passes through all of the selected nodes 4.

According to Block 133, generating candidate architectures architectures 1*a*+ can include generating a modification 3*a'* of the path 3*a* that corresponds to the known architecture 1*a*#, which, in accordance with a predetermined metric, extends at no more than a predetermined distance d from said path 3*a*.

According to Block 134, generating candidate architectures architectures 1*a*+ can include sampling paths 3*a'* through the graph 3 from a probability distribution that favors proximity to and/or intersections with the path 3*a* that corresponds to the known architecture 1*a*#.

According to Block 135, the candidate architectures architectures 1*a*+ can be generated as part of an evolutionary algorithm.

In Step 140, the candidate architectures architectures 1*a*+ are evaluated using the given boundary conditions 2*a* and/or optimization goals 2*b*.

According to Block 141, the fulfilment of multiple boundary conditions 2*a* and/or optimization goals 2*b* can be aggregated to a rating number.

According to Block 142, as part of the evaluation relating to the boundary conditions 2*a* and/or optimization goals 2*b*, the candidate architecture 1*a*+ can be provided with unseen test data and/or validation data in the training phase.

In Step 150, a candidate architecture 1*a*+ having the best rating 7 is ascertained as the sought optimal architecture 1*a. This optimal architecture 1*a defines the neural network 1.

In Step 160, the ascertained optimal architecture 1*a is trained or further trained with training examples 8***a* respectively labeled with target outputs 8*b* relating to the given task. The trained or further trained state of the architecture 1*a is identified with the reference sign 1*a*.

In Step 170, the ascertained optimal architecture 1*a, 1*a* is provided with measurement data 8 recorded with at least one sensor.

In Step 180, a control signal 180*a* is ascertained from the thus obtained output 9 of the architecture 1*a, 1*a*.

In Step 190 a vehicle 50, a robot 51, a driving assistance system 60, a system 70 for quality control, a system 80 for monitoring areas and/or a system 90 for medical imaging are controlled by means of the control signal 180*a*.

Figure 2:
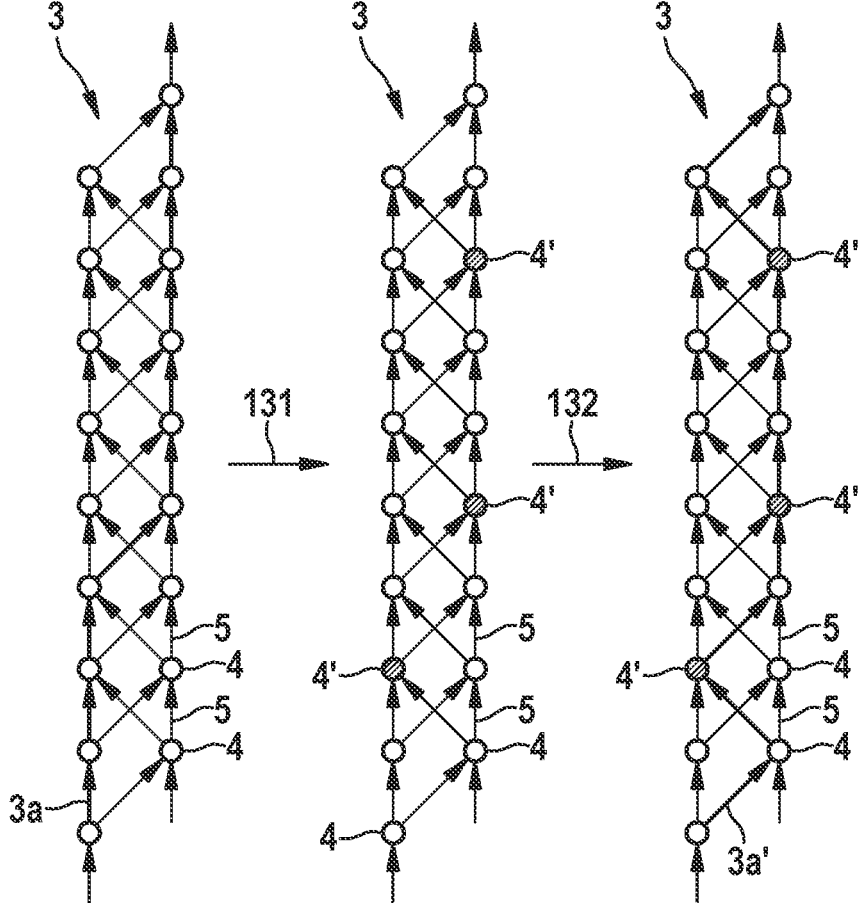
FIG. 2 shows an example of modifying a path 3*a* through the graph 3 such that said path still leads through predetermined nodes 4, according to the present invention.

FIG. 2 shows an example of how a path 3*a* through the graph 3 can be developed to a modification 3*a'* such that said path still leads through predetermined nodes 4.

The graph 3 comprises nodes 4 and edges 5. Starting from the path 3*a* through the graph 3, a subset 4' of the nodes 4 through which the modification 3*a'* should also lead is defined in Step 131. In Step 132, a modification 3*a'* is ascertained (e.g. sampled) that fulfils precisely this condition.

Figure 3:
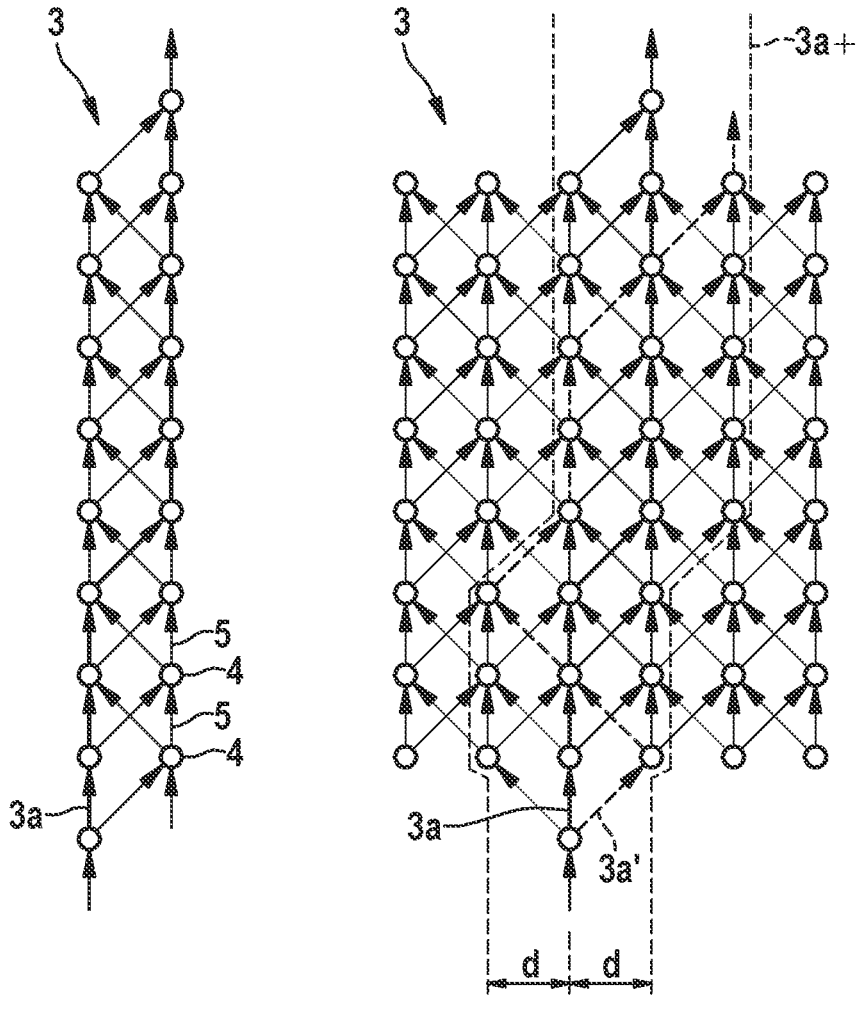
FIG. 3 shows an example of modifying a path 3*a* through the graph 3 such that the modification 3*a'* extends at no more than a predetermined distance d from the path 3*a*, according to the present invention.

FIG. 3 shows an example of how a modification 3*a'* to a path 3*a* through the graph 3 can be ascertained such that the modification 3*a'* extends at no more than a predetermined distance d from the path 3*a*.

The requirement of a maximum distance d defines an area 3*a*+ in the graph 3 in which the modification 3*a'* can extend. It can be sampled in such a way, for example, that it extends in this area.

What is claimed is:

1. A computer-implemented method for ascertaining an optimal architecture for a neural network that solves a given task in accordance with given boundary conditions and/or optimization goals, the method comprising the following steps:

providing a graph of possible architectures of nodes and edges, wherein;

each of the nodes corresponds to data;

each of the edges corresponds to one or more parameterized operations to be carried out on the data; and a path which traverses the entire graph corresponds to an architecture of the possible architectures;

generating, in a search phase, candidate architectures based on already known architectures, wherein the candidate architectures are similar but not identical to the already known architectures in accordance with a predetermined criterion;

evaluating the candidate architectures using the given boundary conditions and/or optimization goals;

ascertaining a candidate architecture of the candidate architectures having a best rating as the ascertained optimal architecture;

providing the ascertained optimal architecture with measurement data recorded with at least one sensor;

ascertaining a control signal from output obtained from the ascertained optimal architecture; and controlling, using the control signal, a vehicle, and/or a robot, and/or a driving assistance system, and/or a system for quality control, and/or a system for monitoring areas and/or a system for medical imaging.

2. The method according to claim 1, wherein an already known architecture of the already known architectures is modified to at least one candidate architecture by directly changing at least one edge of the already known architecture.

3. The method according to claim 1, wherein the boundary conditions and/or optimization goals include:

how quickly, and/or with what accuracy, the candidate architecture solves the given task; and/or to what extent predetermined types of errors are avoided when solving the given task; and/or how much working memory is needed to execute the candidate architecture; and/or how many processors and/or GPUs are needed to execute the candidate architecture.

4. The method according to claim 1, wherein fulfilment of multiple boundary conditions and/or optimization goals is aggregated to a rating number.

5. The method according to claim 1, wherein the generating of the candidate architectures includes selecting a subset of nodes of the path that corresponds to an already known architecture of the already known architectures and generating a modification of the path that corresponds to the already known architecture that still passes through all of the selected subset of nodes.

6. The method according to claim 5, wherein the generating of the candidate architectures includes generating a modification of the path that corresponds to the already known architecture, which, in accordance with a predetermined metric, extends at no more than a predetermined distance from the path that corresponds to the already known architecture.

7. The method according to claim 1, wherein the generating of the candidate architectures includes sampling paths through the graph from a probability distribution that maximizes proximity to and/or intersections with the path that corresponds to an already known architecture of the already known architectures.

8. The method according to claim 1, wherein, as part of the evaluation using the boundary conditions and/or optimization goals, a candidate architecture of the candidate architectures is provided with unseen test data and/or validation data in a training phase.

9. The method according to claim 1, wherein the given task includes evaluating measurement data in the form of image data and/or point clouds.

10. The method according to claim 1, wherein the given task includes mapping input of the neural network to classification scores relating to one or more classes of a predetermined classification and/or to a regression value relating to at least one quantity of interest.

11. The method according to claim 1, wherein the candidate architectures are generated as part of an evolutionary algorithm.

12. The method according to claim 1, wherein, before the search phase, learning steps regarding the given task are carried out in a training phase for architectures sampled from the graph.

13. The method according to claim 1, wherein the ascertained optimal architecture is trained or further trained with training examples respectively labeled with target outputs relating to the given task.

14. A non-transitory machine-readable storage medium on which is stored one or more computer programs for ascertaining an optimal architecture for a neural network that solves a given task in accordance with given boundary conditions and/or optimization goals, the one or more computer programs, when executed by one or more processors, causing the one or more processors to perform the following steps:

providing a graph of possible architectures of nodes and edges, wherein:

each of the nodes corresponds to data;

each of the edges corresponds to one or more parameterized operations to be carried out on the data; and a path which traverses the entire graph corresponds to an architecture of the possible architectures;

generating, in a search phase, candidate architectures based on already known architectures, wherein the candidate architectures are similar but not identical to the already known architectures in accordance with a predetermined criterion;

evaluating the candidate architectures using the given boundary conditions and/or optimization goals;

ascertaining a candidate architecture of the candidate architectures having a best rating as the ascertained optimal architecture;

providing the ascertained optimal architecture with measurement data recorded with at least one sensor;

ascertaining a control signal from output obtained from the ascertained optimal architecture; and controlling, using the control signal, a vehicle, and/or a robot, and/or a driving assistance system, and/or a system for quality control, and/or a system for monitoring areas and/or a system for medical imaging.

15. One or more computers comprising one or more processors and a non-transitory machine-readable storage medium on which is stored one or more computer programs for ascertaining an optimal architecture for a neural network that solves a given task in accordance with given boundary conditions and/or optimization goals, the one or more computer programs, when executed by the one or more processors, causing the one or more processors to perform the following steps:

providing a graph of possible architectures of nodes and edges, wherein:

each of the nodes corresponds to data;

each of the edges corresponds to one or more parameterized operations to be carried out on the data, and a path which traverses the entire graph corresponds to an architecture of the possible architectures;

generating, in a search phase, candidate architectures based on already known architectures, wherein the candidate architectures are similar but not identical to the already known architectures in accordance with a predetermined criterion evaluating the candidate architectures using the given boundary conditions and/or optimization goals;

ascertaining a candidate architecture of the candidate architectures having a best rating as the ascertained optimal architecture;

providing the ascertained optimal architecture with measurement data recorded with at least one sensor;

ascertaining a control signal from output obtained from the ascertained optimal architecture; and controlling, using the control signal, a vehicle, and/or a robot, and/or a driving assistance system, and/or a system for quality control, and/or a system for monitoring areas and/or a system for medical imaging.

* * * * *